(12) United States Patent
Green

(10) Patent No.: US 7,484,541 B2
(45) Date of Patent: Feb. 3, 2009

(54) CUTTING TOOTH FOR USE WITH A STUMP CUTTING APPARATUS

(76) Inventor: Kevin J. Green, 4419 Ricker Hwy., Blissfield, MI (US) 49223

( * ) Notice: Subject to any disclaimer, the term of this patent is extended or adjusted under 35 U.S.C. 154(b) by 0 days.

(21) Appl. No.: 11/610,697

(22) Filed: Dec. 14, 2006

(65) Prior Publication Data

US 2008/0142120 A1    Jun. 19, 2008

(51) Int. Cl.
*A01G 23/06*    (2006.01)
*B27G 13/00*    (2006.01)

(52) U.S. Cl. .................. 144/24.12; 144/241; 407/35; 407/40; 407/43; 407/53

(58) Field of Classification Search .................. 144/334, 144/24.12, 176, 241; 407/30, 33–35, 40, 407/42, 43, 46–48, 53, 54, 65, 103; 299/101, 299/103, 113

See application file for complete search history.

(56) References Cited

U.S. PATENT DOCUMENTS

| | | | | |
|---|---|---|---|---|
| 1,155,211 A | * | 9/1915 | Carpenter | 408/156 |
| 1,160,042 A | * | 11/1915 | Carpenter | 408/156 |
| 5,307,719 A | * | 5/1994 | MacLennan | 83/839 |
| 5,644,965 A | * | 7/1997 | MacLennan et al. | 83/842 |
| 5,743,314 A | * | 4/1998 | Puch | 144/24.12 |

* cited by examiner

*Primary Examiner*—Shelley Self
(74) *Attorney, Agent, or Firm*—Burgess Law Office, PLLC

(57) ABSTRACT

A cutting tooth for use with a stump cutting apparatus wherein the cutting tooth has a removable and replaceable cutting bit. The cutting bit is removably and nonrotatably secured to a head of an elongated shank with the shank secured to a mounting block or pocket of a stump cutting tool. A support member having an indexing surface is also removably and nonrotatably secured to the head of the elongated shank. Accordingly, the support member enables indexing the cutting bit to expose and use a plurality of cutting edges located on the periphery of the cutting bit.

25 Claims, 2 Drawing Sheets

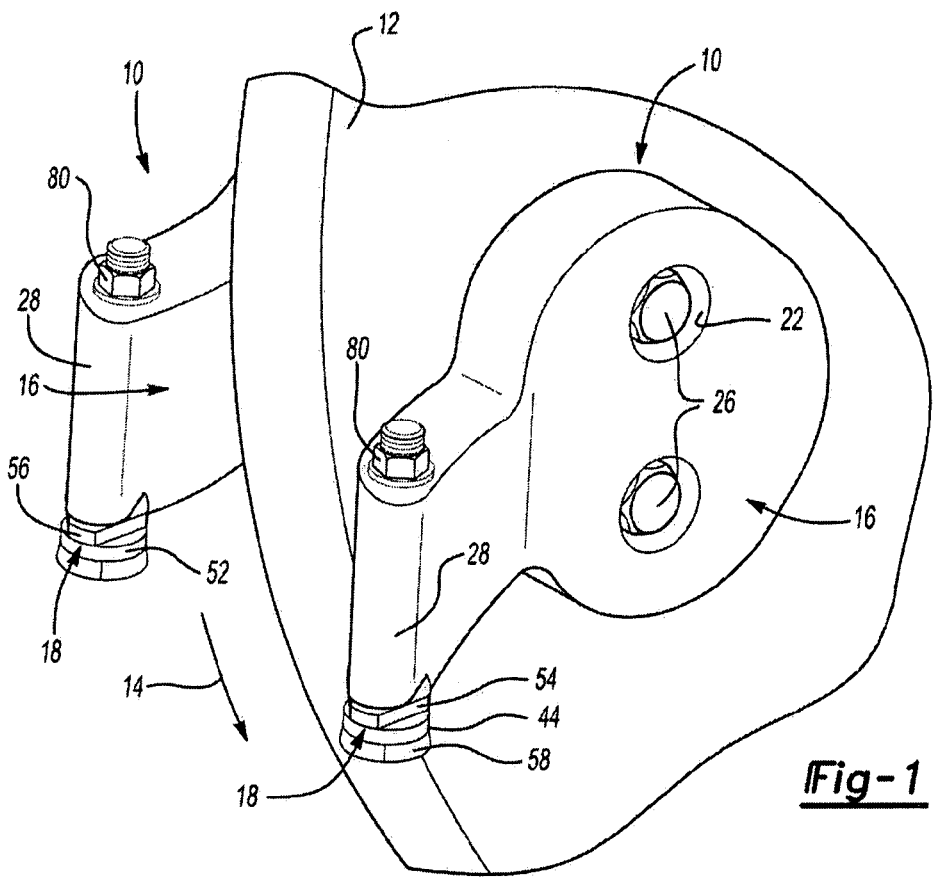
Fig-1
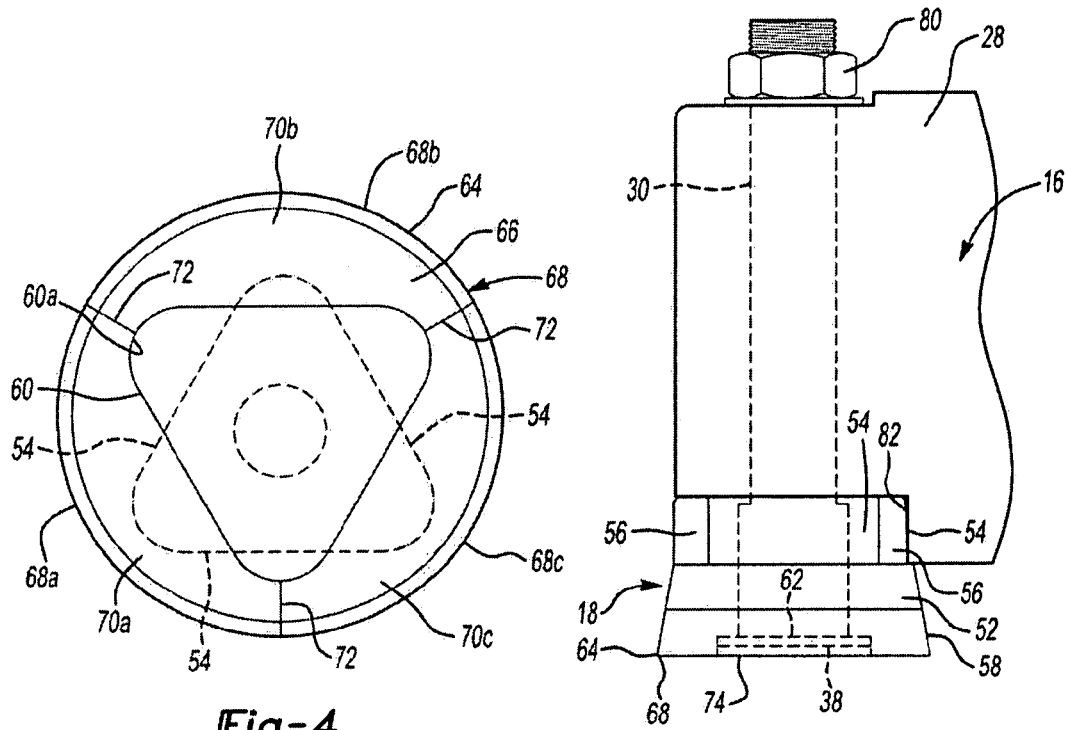
Fig-4
Fig-2

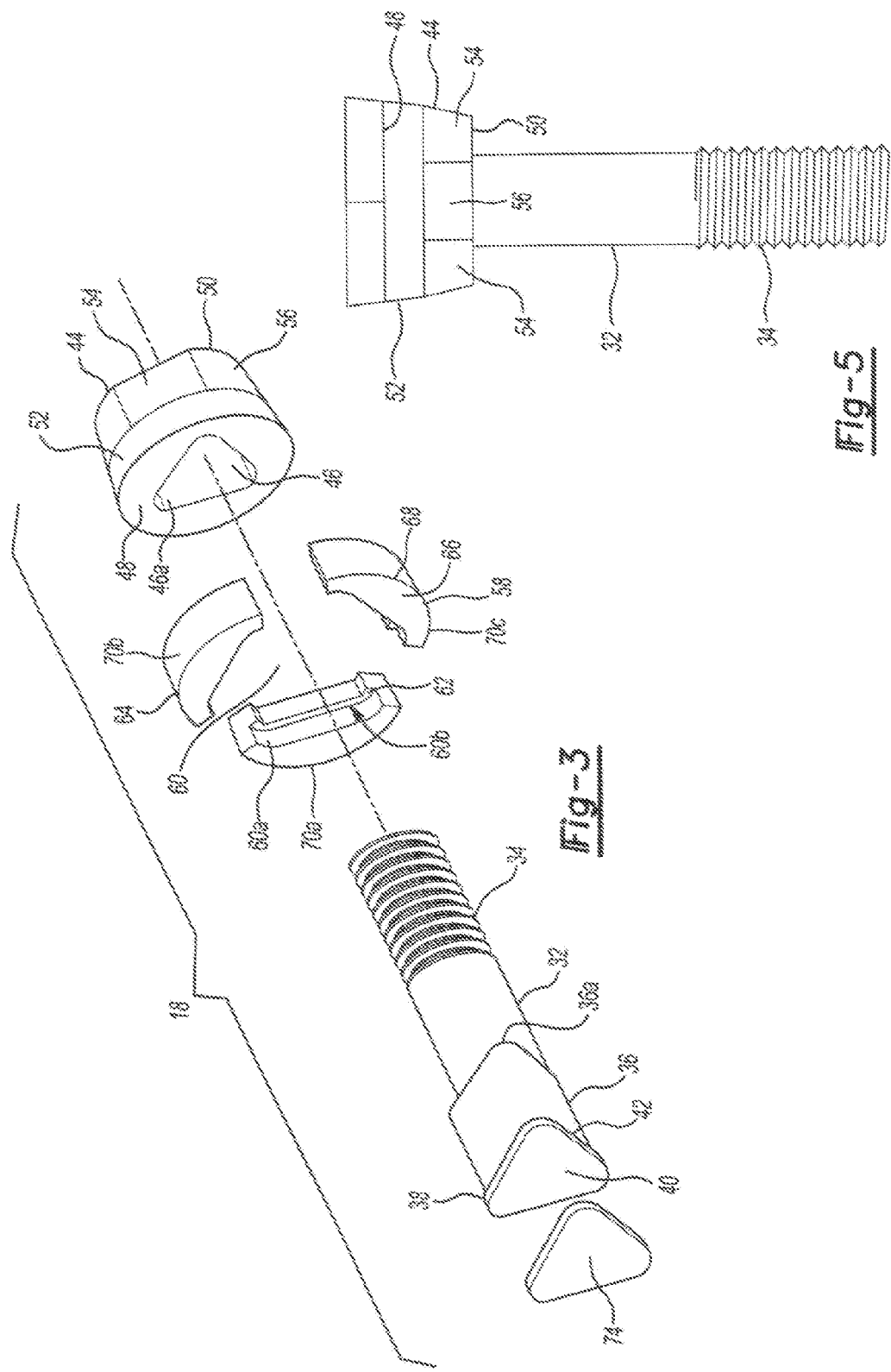

CUTTING TOOTH FOR USE WITH A STUMP CUTTING APPARATUS

CROSS-REFERENCE TO RELATED APPLICATIONS

Not Applicable.

BACKGROUND OF THE INVENTION

1. Field of the Invention

The present invention relates generally to a stump cutting apparatus and more specifically to a cutting tooth used with a stump cutting apparatus.

2. Description of Related Art

Stump cutters or stump cutting machines are generally known in the art and are used to cut or grind stumps. A typical stump cutter includes a plurality of cutting tools mounted to a rotatable cutting wheel or drum. Placing the wheel or drum against a stump and rotating it causes the cutting tools, and more particularly individual cutting teeth, to engage and cut away the stump. Tool holders, sometimes referred to as pockets, are used to secure the cutting teeth to the cutting wheel.

Due to the harsh environment these cutting teeth are subjected to replacement of the cutting teeth is almost a continuous job. For example, contact with the ground surface rapidly dulls the cutting edge of each cutting tooth. Further, if a cutting tooth strikes something hard such as a stone or rock the cutting bit or an edge thereof may break or chip requiring replacement of the cutting tooth. In addition, depending upon the particular cutting tooth design or style a carbide cutting bit is used. In many instances only a portion of the carbide cutting bit actually performs the cutting operation of thus wasting the remaining portion or cutting edge of the carbide cutting bit. Finally, continuous loading of the cutting tooth can cause cutting tooth failure including twisting or bending of the shank portion. In some instances, the tooth itself may break thus necessitating replacement. As cutting tooth replacement is costly both in material replacement costs and man-hours to remove and install each individual new cutting tooth it is desirable to use as much of the cutting bit as possible and replace only the worn or used cutting bit as necessary while maximizing use of the entire cutting bit.

One type of cutting tooth and tool holder/pocket assembly is disclosed in the U.S. Pat. No. 5,743,314 the disclosure of which is hereby incorporated by reference. As set forth therein, the '314 patent discloses a stump cutting tool assembly including a cutting tooth having an insert made of a solid material such as tungsten carbide and a generally cylindrical shank that extends through an aperture in a mounting block or pocket. As known, changing each cutting tooth can be expensive. Thus, reducing the amount of the cutting tooth that must be replaced and increasing the life of the cutting bit increases the overall desirability of a cutting tooth. Accordingly, there is a need in the art for a cutting tooth having a replaceable cutting bit for use with a stump cutting tool.

SUMMARY OF THE INVENTION

Accordingly, the present invention provides a cutting tooth for use with a stump cutting apparatus of the type using a rotatable cutting wheel or drum. The cutting tooth includes an elongated shank having a head and a fastening mechanism. A cutting bit having an aperture therein is removably and non-rotatably disposed on the head of the shank. In addition, a support member also having an aperture therein is removably and nonrotatably disposed on the head of the shank adjacent the cutting bit. The cutting bit and support member are located on the head of the elongated shank; the fastening mechanism secures the shank to a pocket or mounting block.

In a further embodiment, a plurality of connected segments join together to form the cutting bit. The segments are connected such that the interface or boundary between each of the respective segments forms a barrier that reduces crack travel or migration between the respective segments. In an additional embodiment, the cutting bit is connected to the support member.

Accordingly the present invention provides a cutting tooth having a removable and replaceable cutting bit whereby the shank and support portions of the cutting tooth may be reused.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 1 is a partial perspective view of a stump cutting tool having a cutting tooth according to the present invention attached to a cutting wheel of a stump cutting apparatus.

FIG. 2 is a partial side view of the stump cutting tool of FIG. 1.

FIG. 3 is an exploded perspective view of the cutting tooth of FIG. 1 according to the present invention.

FIG. 4 is an end view of a cutting tooth according to the present invention.

FIG. 5 is a side view of a cutting tooth according to the present invention.

DETAILED DESCRIPTION OF THE PREFERRED EMBODIMENTS

Referring now to the drawings, specifically FIGS. 1-2, a plurality of stump cutting tools, seen generally at 10, are shown attached in pairs to a cutting wheel 12 of a stump cutting apparatus (not shown.) The stump cutting apparatus supports the cutting wheel 12 in a known manner for rotation in the direction shown by the arrow 14. It should be understood that a stump cutting apparatus of this type is conventional and known in the art. Also, while shown herein with a cutting wheel 12, the present invention may be used with a tool assembly attached to a cutting drum.

Initially, it should be understood that the cutting tool assembly 10 includes a pocket or mounting block 16 and a cutting tooth 18. As illustrated in FIG. 1 the pockets or mounting blocks 16 are typically secured to the cutting wheel 12 in pairs. In the disclosed embodiment one of the pockets 16 includes a through bore or aperture having an adjacent countersunk portion 22 with the opposite pocket having a threaded bore or aperture. A fastener 26 extends through the through bore or aperture, through an aperture in the cutting wheel 12 and threadably engages the threaded bore or aperture on the opposite or complementary pocket 16. Tightening the fastener 26 draws the respective pockets 16 together and sandwiches the cutting wheel 12 there between to secure the pockets 16 to the cutting wheel 12. Although only two fasteners 26 are used to secure the pockets 16 to the cutting wheel 12, additional fasteners 26 may also be used.

Each pocket or mounting block 16 includes a cutting tooth holder portion 28 having an aperture 30 extending longitudinally, radially or circumferentially therethrough. Accordingly, the pocket or mounting block 16 is secured to the cutting wheel 12 with the cutting tooth 18 disposed and secured in the aperture 30.

Turning now to FIGS. 3-5 there is shown in greater detail a cutting tooth 18 according to the present invention. The cutting tooth 18 includes a shank 32 having a fastening or retention mechanism, shown herein as a threaded portion 34 located on one end of the shank 32, and a triangular shaped head 36 located on the opposite end. As shown, the threaded portion 34 receives a retaining member such as a nut 80 that secures the cutting tooth 18 to the mounting block or pocket 16. Since the fastening mechanism functions to secure the cutting tooth 18 to the pocket or mounting block 16, other fastening mechanisms including those using other retaining members can also be used. For example a spring-loaded retaining pin or detent member located on said shank, a retaining ring that fits into a groove on the shank 32 or a spring-loaded ring located on the shank 32 and engaging the pocket or mounting block 16 are suitable for retaining or fastening the cutting tooth 18 to the pocket or mounting block 16. In addition, a tapered shank 32 that fits into a correspondingly tapered aperture located in the pocket or mounting block 16 is also suitable for securing the cutting tooth 18 to the pocket or mounting block 16. Accordingly, while the threaded portion 34 is one fastening mechanism for attaching or fastening the cutting tooth 18 to the mounting block 16, other fastening mechanisms are also suitable and come within the scope of the present invention.

A flange member or radially extending lip 38 extends around the periphery of the head 36 adjacent a leading end or face 40 thereof. The flange member 38 provides a shoulder surface 42 that functions as a stop. While shown herein as an integral part of the head 36, the flange member 38 can be removably attached to the head 36.

A support member 44 having a triangular shaped aperture 46 extending longitudinally from a leading end 48 to a trailing end 50 of the support member fits over and on the head 36. The triangular shaped head 36 and triangular shaped aperture 46 are complementary shaped to provide a secure, non-rotatable mating configuration. Accordingly, other complementary shapes or configurations could also be used provided they enable placing the support member 44 on the head 36 in a non-rotatable manner. The support member 44 further includes a backing plate 52 located at the leading end 44 and a plurality of flat surfaces 54 extending longitudinally about the outer or peripheral surface 56 of the support member 44 adjacent to the trailing end 50 thereof. The flat surfaces 54 provide a detent mechanism enabling indexing or selective rotation of the cutting tooth 18 about the longitudinal axis of the shank 32. Accordingly, while the preferred embodiment illustrates three flat surfaces 54 that provide a detent mechanism, other configurations or shapes that provide a rotatable indexing feature enabling the cutting tooth 18 to be selectively positioned at a plurality of positions with respect to the pocket or mounting block 16 are contemplated and are within the scope of the present invention.

The support member 44 supports a cutting bit 58 made of a material such as tungsten carbide on the head 36. The cutting bit 58 includes a triangular shaped aperture 60 complementary to the triangular shape of the head 36, such that the cutting bit 58 fits on the head 36. As set forth above, the shape or configuration of the aperture 60 in the cutting bit 58 is such that it provides a secure, non-rotatable mating configuration with the head 36. Like the aperture 46 in the support member 44, the aperture 60 in the cutting bit 58 may also have a variety of other complementary shapes or configurations. For example, the apertures may have a circular, square, rectangular, lobe or other shape and may include a serrated or grooved surface. As set forth herein, the support member 44 and the cutting bit 58 are placed on the head 36. Since it is contemplated that the cutting bit 58 can be attached or fastened to the support member 44 by some type of fastening mechanism including welding, brazing, bonding, adhesive or mechanical fastener it is not necessary that the aperture 60 in the cutting bit 58 have a shape complementary to the head 36. When positioning the cutting bit 58 on the head 36 separate or unconnected from the support member 44, for example when the cutting bit 58 and the support member 44 are placed on the head 36 in a side by side stacked relationship, it is desirable that the aperture 60 of the cutting bit 58 be complementary to the cross-sectional shape of the head 36. In addition, it is not necessary that both of the apertures 46, 60 of the respective support member 44 and cutting bit 58 be complementary to one another. In some instances it may be desirable to use a different configuration for each aperture with the head 36 being shaped accordingly. For instance, the aperture 60 of the cutting bit 58 may be cylindrical while the aperture 46 of the support member 44 may have a triangular shaped cross section.

As shown, the corners or vertices 46a, 60a of the aperture 46 in the support member 44 and the aperture 60 in the cutting bit 58 are rounded or curved to reduce potential cracking or failure at these corners or vertices 46a, 60a. In addition, is not necessary that the apertures 46, 60 of the respective support member 44 and cutting bit 58 have a shape complementary to the vertices or corners of the head 36. For example, the vertices 46a, 60a of the respective apertures 46, 60 may include a small cylindrical aperture at the apex of the each vertex as such a structure is known to help reduce cracking at the vertex or intersection of respective sides of the apertures 46, 60. It should be understood that the respective apertures 46, 60 of the support member 44 and cutting bit 58 need only be complementary to the shape of the head 36 to a degree necessary to prevent relative rotation between the respective components.

As illustrated in FIGS. 2-4 a portion of the triangular shaped aperture 60 has a slightly larger size 60b that forms a ledge or seat 62 at the intersection of the respective triangular shaped apertures 60, 60b. Accordingly, as the cutting bit 58 is positioned on the head 36 of the shank 32, the flange member 38 engages the ledge or seat 62 to retain the cutting bit 58 and the corresponding support member 44 on the head 36 of the shank 32.

The peripheral edge 64 of the front surface 66 of the cutting bit 58 defines a cutting edge 68. In accordance with a further aspect of the present invention, the cutting bit 58 is formed from a plurality of segments 70a, 70b, 70c. As illustrated in FIG. 3 the cutting bit 58 includes three segments 70a, 70b, 70c fastened or joined together at segment lines or boundaries 72, see FIG. 4. Brazing or welding is one bonding agent used for fastening or joining the respective segments 70a, 70b, 70c together to form the cutting bit 58. Other bonding agents or mechanical means to join the respective segments can also be used, for example, structural adhesives or cements and mechanical fasteners can be used. Forming the cutting bit 58 of a plurality of segments 70a, 70b, 70c provides a plurality of interfaces each of which form a barrier that impedes crack travel or migration through the cutting bit 58. For example, during the stump cutting process shock loading of the cutting bit 58, typically occurring when the bit 58 strikes a hard surface or object, can cause cracks in the cutting bit 58. Often these cracks propagate through the cutting bit 58 causing premature failure of the cutting bit 58 necessitating replacement. Accordingly, the interface 72 located between the respective segments 70a, 70b, 70c reduces the possibility that a crack formed in one segment 70a, 70b, 70c will travel to the remaining segments 70a, 70b, 70c thus increasing the overall life of the cutting bit 58. In addition, the material or method used to fasten or join the segments 70a, 70b, 70c can also on reduce crack propagation through the cutting bit 58.

In addition, a wear plate 74 may be attached or connected to the front or leading end or face 40 of the head 36. When a wear plate 74 is used, the ledge or seat 62 of the cutting bit 58 normally extends inward to a depth such that the wear plate 74 is flush with the surface of the cutting bit 58. The wear plate 74 may be a hard material such as tungsten carbide that functions to reduce wear on the head 36 of the shank 32. When used, the wear plate 74 is attached, typically by brazing, to the leading end or face 40 of the head 36.

Accordingly, the cutting tooth 18 is assembled by placing the cutting bit 58 and support member 44 on the head 36 of the shank 32. The cutting bit 58 and the support member 44 can be attached or placed on the head 36 of the shank 32 separately or as a single member. For example, in some instances it may be advantageous to braze or otherwise attach the cutting bit 58 to the support member 44 prior to placing the components on the head 36 of the shank 32. In most instances, the cutting bit 58 is placed on the head 36 of the shank 32 separate from the support member 44. This arrangement allows replacement of only the cutting bit 58 when all of the cutting edges 68a, 68b, 68c of the respective segments 70a, 70b, 70c become dull. Thus, the shank 32 and support member 44 are reusable.

Once assembled, the cutting tooth 18 is connected to the pocket or mounting block 16 by placing the shank portion through the aperture 30 in the cutting tooth holder portion 28 of the pocket 16. The length of the aperture 30 is such that the threaded portion 34 of the shank 32 extends past the cutting tooth holder portion 28 and receives a threaded fastener such as a nut 80. The flats 54 engage a ledge or abutment 82 on the cutting tooth holder portion 28 of the pocket 16 to prevent rotation of the cutting bit 58. Accordingly, the cutting tooth 18 may be indexed to provide a new cutting edge by loosening the nut or fastener 80 and sliding the shank 32 outward, away from the tool holder portion 28, to disengage the flat 54 of the support member 44 from the ledge or abutment 82. The cutting tooth 18 is then rotated to provide a fresh cutting edge 68, slid back into place where a flat 54 engages the ledge or abutment 82 and the nut 80 is retightened to secure the cutting tooth 18 in place.

As disclosed herein, the cutting bit 58 includes three segments 70a, 70b, 70c that provide three cutting edges 68a, 68b, 68c. It should be understood that the cutting bit 58 does not need to include three segments but may be formed as a single piece. In addition, it may also include two or more segments as needed. Once these cutting edges become dull broken or otherwise unusable, the cutting tooth 18 is removed from the tool holder 28 and the support member 44 slides off the head 36 of the shank enabling removal and replacement of the cutting bit 58. Once a new cutting bit 58 is installed, the entire cutting tooth 18 is placed back on the pocket or mounting block 16. It should be understood that the present invention provides a cutting tooth 18 that facilitates replacement of the cutting bit 58 without requiring replacement of the entire cutting tooth 18 thereby reducing the overall cost. Further, by using a segmented cutting bit 58 overall cutting bit 58 failure is reduced thereby increasing the life of the cutting bit 58 and correspondingly increasing its usefulness and thus value.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cutting tooth for use with a stump cutting apparatus comprising:
    an elongated shank having a head and a fastening mechanism;
    a cutting bit, said the cutting bit having an aperture therein, said cutting bit removeably and nonrotatably disposed on said head of said shank such that said head of said shank is located in said aperture of said cutting bit; and
    a support member, said support member having an aperture therein, said support member removeably and nonrotatably disposed adjacent said cutting bit on said head of said shank such that said head of said shank is located in said aperture of said support member.

2. A cutting tooth for use with a stump cutting apparatus as set forth in claim 1 including said cutting bit having a plurality of segments, each of said segments joined together to form said cutting bit whereby an interface between each joined segment forms a barrier that reduces the propensity for crack travel through the cutting bit.

3. A cutting tooth for use with a stump cutting apparatus as set forth in claim 2 including said plurality of segments formed of a carbide material and each of said segments formed of a carbide material joined together by a bonding agent.

4. A cutting tooth for use with a stump cutting apparatus as set forth in claim 2 including said plurality of segments formed of a carbide material and each of said segments formed of a carbide material joined together by brazing together such that said brazing forms a part of said interface between each joined segment.

5. A cutting tooth for use with a stump cutting apparatus as set forth in claim 1 wherein said cutting bit is connected to said support member.

6. A cutting tooth for use with a stump cutting apparatus as set forth in claim 1 wherein said aperture in said cutting bit has a predetermined configuration and at least a portion of said head having a complementary configuration to that of said aperture in said cutting bit.

7. A cutting tooth for use with a stump cutting apparatus as set forth in claim 1 wherein at least a portion of said head has a generally triangular shaped cross section; and
    said apertures on said cutting bit and said support member have a generally triangular shape complementary to the generally triangular shaped cross section of said head.

8. A cutting tooth for use with a stump cutting apparatus as set forth in claim 1 including a flange located on a leading end of said head; and
    a seat formed in said cutting bit, said flange disposed in said seat and operative to retain said cutting bit on said head.

9. A cutting tooth for use with a stump cutting apparatus as set forth in claim 1 wherein said fastening mechanism includes a retaining member.

10. A cutting tooth for use with a stump cutting apparatus as set forth in claim 1 wherein said fastening mechanism includes a threaded portion.

11. A cutting tooth for use with a stump cutting apparatus as set forth in claim 1 wherein said support member includes an indexing structure.

12. A cutting tooth for use with a stump cutting apparatus as set forth in claim 11 wherein said indexing structure includes a plurality of flats located about an outer peripheral surface of said support member.

13. A cutting tooth for use with a stump cutting apparatus as set forth in claim 1 including said head having a leading face; and
a wear plate attached to said leading face.

14. A cutting tooth for use with a stump cutting apparatus comprising:
a shank having a multisided head and a threaded portion, said multisided head having a flange located at a leading face of said head;
a cutting bit, said cutting bit having a multisided aperture, said aperture sized to fit over said head such that said cutting bit is positioned on said head with said head located in and contiguous with said aperture of said cutting bit and adjacent said flange; and
a support member having a multisided aperture, said aperture sized to fit over said head and an indexing structure located on an outer surface of said support member whereby said support member is positioned on said head with said head located in and contiguous with said aperture of said support member and adjacent said cutting bit whereby the cutting bit and support member are placed on said head in a side-by-side relationship with both of said cutting bit and said support member contacting said head.

15. A cutting tooth for use with a stump cutting apparatus as set forth in claim 14 wherein said cutting bit includes a plurality of connected segments with an interface formed between connected segments, the interface between said segments forming a barrier.

16. A cutting tooth for use with a stump cutting apparatus as set forth in claim 14 wherein said head includes a longitudinally extending portion having a triangular shaped cross section.

17. A cutting tooth for use with a stump cutting apparatus as set forth in claim 14 wherein the multisided head and the multisided aperture located in said support member have a complementary configuration.

18. A cutting tooth for use with a stump cutting apparatus as set forth in claim 1 wherein said indexing structure includes a plurality of flats located about an outer peripheral surface of said support member.

19. A cutting tooth for use with a stump cutting apparatus as set forth in claim 14 including said head having a leading face; and
a wear plate attached to said leading face.

20. A cutting tooth for use with a stump cutting apparatus as set forth in claim 14 wherein said cutting bit is attached to said support member.

21. A cutting tooth for use with a stump cutting apparatus comprising:
a shank having a fastening mechanism and a head, said head including an elongated member and a flange member located on said head adjacent a leading end of said head;
a support member having a leading end and a trailing end, said support member further having an aperture, said aperture extending between said leading end and trailing end;
a plurality of flats located on a peripheral surface of said support member, said elongated member located in said aperture of said support member whereby said support member is removably disposed on said elongated member of said head; and
a cutting bit, said cutting bit having an aperture extending through said cutting bit, said elongated member located in said aperture of said cutting bit whereby said cutting bit is removably disposed on said elongated member of said head between said flange member and said support member.

22. A cutting tooth for use with a stump cutting apparatus as set forth in claim 21 including said cutting bit formed of a plurality of individual segments connected to one another whereby an interface between the connected segments reduces crack propagation between the respective segments.

23. A cutting tooth for use with a stump cutting apparatus as set forth in claim 21 wherein said individual segments are connected to one another by a bonding agent.

24. A cutting tooth for use with a stump cutting apparatus as set forth in claim 21 wherein said cutting bit is connected to said support member.

25. A cutting tooth for use with a stump cutting apparatus as set forth in claim 21 whereby said elongated member of said head and said aperture in said support member are configured to prevent relative rotation between said support member and said head when said support member is located on said head.

* * * * *